United States Patent
Suzuki

(10) Patent No.: US 9,734,392 B2
(45) Date of Patent: Aug. 15, 2017

(54) IMAGE PROCESSING DEVICE AND IMAGE PROCESSING METHOD

(71) Applicant: FUJITSU LIMITED, Kawasaki-shi, Kanagawa (JP)

(72) Inventor: Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 14/488,389

(22) Filed: Sep. 17, 2014

(65) Prior Publication Data

US 2015/0110347 A1 Apr. 23, 2015

(30) Foreign Application Priority Data

Oct. 22, 2013 (JP) ................................ 2013-219496

(51) Int. Cl.
| | | |
|---|---|---|
| G06K 9/00 | (2006.01) | |
| G06K 9/20 | (2006.01) | |
| G06T 7/73 | (2017.01) | |
| G06T 7/593 | (2017.01) | |

(52) U.S. Cl.
CPC ..... *G06K 9/00375* (2013.01); *G06K 9/00355* (2013.01); *G06K 9/2081* (2013.01); *G06T 7/593* (2017.01); *G06T 7/73* (2017.01); *G06T 2207/10021* (2013.01);
(Continued)

(58) Field of Classification Search
CPC ................ G06T 19/006; G06T 7/0075; G06T 2207/10021; G06T 2207/10012; G06T 7/002
See application file for complete search history.

(56) References Cited

U.S. PATENT DOCUMENTS

| | | | | |
|---|---|---|---|---|
| 2003/0038875 A1* | 2/2003 | Ivanov | .................... | G06T 7/246 348/43 |
| 2010/0134442 A1* | 6/2010 | Yang | ....................... | G06F 3/042 345/175 |

(Continued)

FOREIGN PATENT DOCUMENTS

| | | |
|---|---|---|
| JP | 2006-226965 | 8/2006 |
| JP | 2006226965 A * | 8/2006 |

OTHER PUBLICATIONS

Song, Peng, Hang Yu, and Stefan Winkler. "Vision-based 3D finger interactions for mixed reality games with physics simulation." Proceedings of The 7th ACM SIGGRAPH International Conference on Virtual-Reality Continuum and Its Applications in Industry. ACM, 2008.*

(Continued)

*Primary Examiner* — Jonathan S Lee
(74) *Attorney, Agent, or Firm* — Staas & Halsey LLP

(57) ABSTRACT

An image processing device includes a processor; and a memory which stores a plurality of instructions, which when executed by the processor, cause the processor to execute: acquiring a first image and a second image which are captured by cameras having optical axes different from each other; calculating a calculation length of a first portion of a user in a world coordinate system based on parallax of a camera coordinate system of a first portion which is included in the first image and the second image; and detecting non-synchronization state of image capturing timings of the first image and the second image based on a change amount of the calculation length.

14 Claims, 13 Drawing Sheets

| IMAGE | FINGER ID | FINGERTIP (FINGER) COORDINATE (pixel) |
|---|---|---|
| FIRST IMAGE | 1 | (210,260) |
| | 2 | (230,230) |
| | 3 | (240,200) |
| | 4 | (250,220) |
| | 5 | (265,255) |
| SECOND IMAGE | 1 | (190,260) |
| | 2 | (210,230) |
| | 3 | (220,200) |
| | 4 | (230,220) |
| | 5 | (245,255) |

80

(52) U.S. Cl.
CPC .............. *G06T 2207/10024* (2013.01); *G06T 2207/20081* (2013.01); *G06T 2207/30196* (2013.01)

(56) References Cited

U.S. PATENT DOCUMENTS

| | | | | |
|---|---|---|---|---|
| 2011/0001799 | A1* | 1/2011 | Rothenberger | G06T 7/187 348/47 |
| 2011/0279655 | A1* | 11/2011 | Tan | G02B 27/2235 348/49 |
| 2012/0019624 | A1* | 1/2012 | Park | H04N 5/2253 348/47 |
| 2012/0120060 | A1* | 5/2012 | Noda | G06F 3/017 345/419 |
| 2013/0120528 | A1* | 5/2013 | Schlosser | H04N 13/0051 348/43 |
| 2013/0182902 | A1* | 7/2013 | Holz | G06K 9/3233 382/103 |
| 2013/0222376 | A1* | 8/2013 | Shimazaki | G02B 27/2228 345/419 |
| 2013/0229497 | A1* | 9/2013 | Delacoux | H04N 13/0296 348/47 |
| 2014/0118501 | A1* | 5/2014 | Kim | H04N 13/0239 348/46 |
| 2015/0009288 | A1* | 1/2015 | Wu | H04N 13/0296 348/43 |
| 2015/0009291 | A1* | 1/2015 | Cheng | H04N 13/0296 348/46 |
| 2015/0123892 | A1* | 5/2015 | Hsieh | G06T 7/0075 345/156 |
| 2015/0160736 | A1* | 6/2015 | Fujiwara | G06F 3/017 345/156 |

OTHER PUBLICATIONS

Crowley, James, François Berard, and Joelle Coutaz. "Finger tracking as an input device for augmented reality." International Workshop on Gesture and Face Recognition. 1995.*

Hung, Yi-Ping, et al. "Free-hand pointer by use of an active stereo vision system." Pattern Recognition, 1998. Proceedings. Fourteenth International Conference on. vol. 2. IEEE, 1998.*

Kimme et al., "Finding Circles by an Array of Accumulators", *Communications of the Association for Computing Machinery*, Feb. 1975, pp. 120-122, vol. 18, No. 2.

Zhang, "A Flexible New Technique for Camera Calibration", *IEEE Transactions on Pattern Analysis and Machine Intelligence*, Nov. 2000, pp. 1330-1334, vol. 22, No. 11.

Shimizu, "A study on Fast 3D Position Estimation with Multiple Unsynchronized Cameras", *Master's Thesis, Department of Computer Science, Chubu University Graduate School of Engineering*, 2005, 81 pp.

Dalal et al., "Histograms of Oriented Gradients for Human Detection", *Proceedings of the 2005 IEEE Computer Society Conference on Computer Vision and Pattern Recognition (CVPR'05)*, Jun. 2005, 8 pp.

* cited by examiner

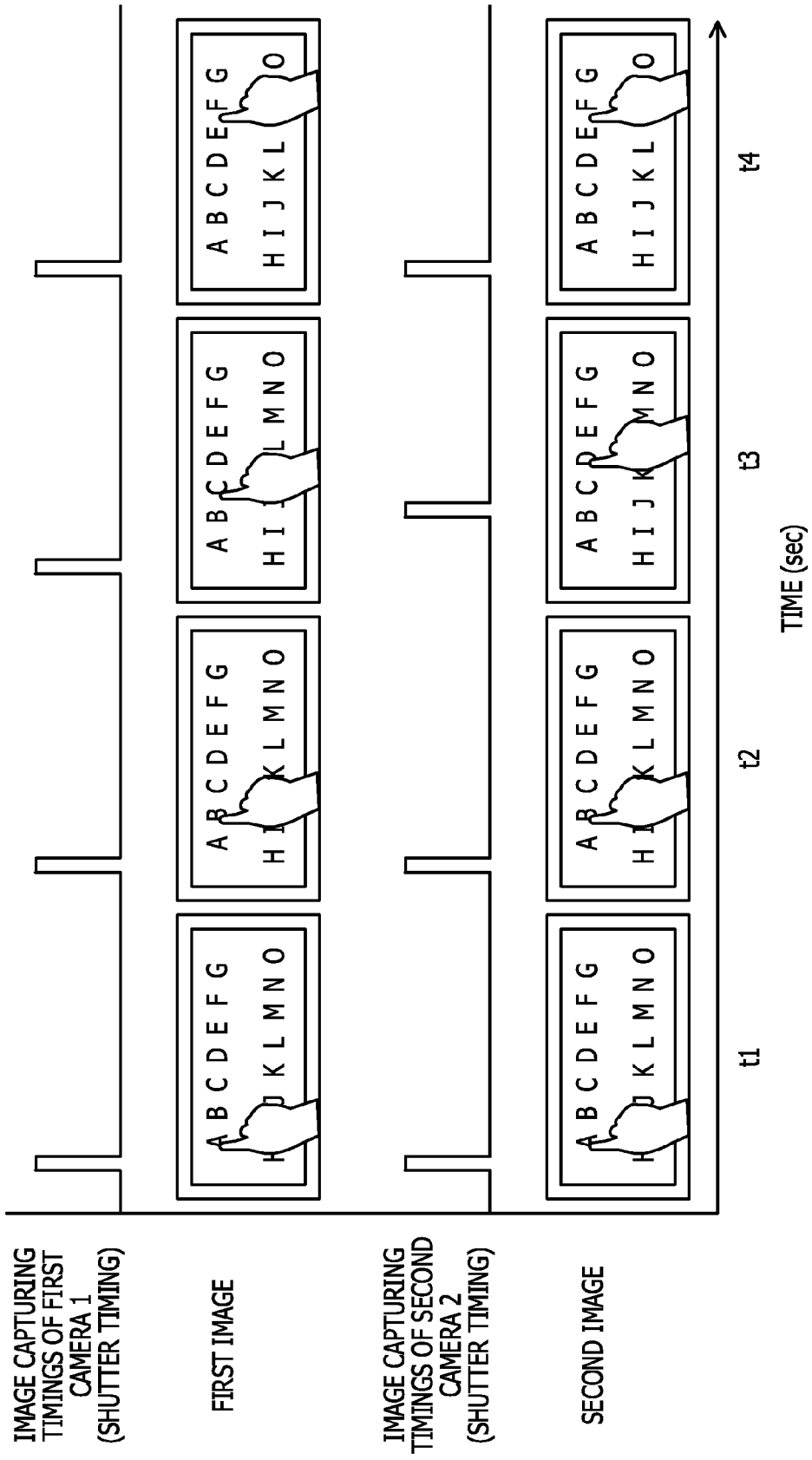

| FINGER ID | FINGER POSITION INFORMATION | | INFORMATION ON CENTER OF HAND | | TANGENT ANGLE VALUE [Tan θ] |
|---|---|---|---|---|---|
| | CAMERA COORDINATE [pixel] | DEPTH [mm] | CAMERA COORDINATE [pixel] | DEPTH [mm] | |
| 1 | (200,260) | 283 | (353,440) | 277 | 1.27 |

| TANGENT ANGLE VALUE [mm] | CAMERA COORDINATE OF CENTER [pixel] | DEPTH OF CENTER [mm] |
|---|---|---|
| 105 | (153,140) | 277 |

91

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2013-219496, filed on Oct. 22, 2013, the entire contents of which are incorporated herein by reference.

FIELD

The embodiments discussed herein are related to an image processing device, an image processing method, and an image processing program which are used for a position calculation of the finger of a user, for example.

BACKGROUND

In the related art, a method of using a paper medium has been used as means of reading a document. Meanwhile, through performance improvement of a computer or development of the internet, a chance of reading an electronic medium document is increased. As an advantage of using the paper medium, it is possible to read it in a large size and to grasp the entire sentences by looking down, and it is inexpensive. On the other hand, as an advantage of using an electronic medium, it is possible to display moving image, such that in internet or video, and it is easy to carry. Accordingly, a new interface which takes advantage of the paper medium of the related art and which is for improving utility value of the document by linking to the electronic medium has been developed.

The above-described interface has a function of displaying additional information related to a paper medium document obtained by capturing the paper medium document placed just in front of the user, by using a camera fixed to an arbitrary place or a freely movable camera. Here, as a technology of displaying the additional information, an information presenting method that is performed by augmented reality (AR) which overlaps with and displays the additional information on the paper medium document or on a document that is projected has been proposed in recent years. By the information presenting method, it is possible to associate the additional information with a display position on a text image, and to link the electronic medium to the paper medium.

Furthermore, a technology also has been developed in which annotation information or the like that is additional information is displayed so as to overlap with the paper medium document, the user performs an interaction operation with respect to the annotation information, thereby realizing work support of the user. For example, an augmented reality technology that presents annotation or the like associated with a real object by projecting an overlapped image including the additional information that is a virtual image, using a projector with respect to the real object such as the paper medium document or the like, is disclosed.

In the above-described augmented reality technology, correctly calculating a position of a finger of the user in a world coordinate system (in three dimensions) using the camera fixed in an arbitrary place or the freely movable camera is desired. A binocular stereo method is known as a general method for calculating the position of the finger in the world coordinate system. The binocular stereo method is used to calculate a distance between an arbitrary reference point and a target object according to the principle of triangulation, using position shift (parallax) of an image occurring when the same object (target object) is captured by two cameras which are in parallel with each other and a positional relationship of which is known. A technology regarding the binocular stereo method is disclosed in, for example, "Shimizu, Fujiyoshi (Chubu University), "Study on high speed three-dimensional position estimation using multiple asynchronous cameras", 2005".

SUMMARY

According to an aspect of the embodiments, an image processing device includes a processor; and a memory which stores a plurality of instructions, which when executed by the processor, cause the processor to execute: acquiring a first image and a second image which are captured by cameras having optical axes different from each other; calculating a calculation length of a first portion of a user in a world coordinate system based on parallax of a camera coordinate system of a first portion which is included in the first image and the second image; and detecting non-synchronization state of image capturing timings of the first image and the second image based on a change amount of the calculation length.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is a conceptual view of image capturing timings of a first camera and a second camera and a position of a finger in a camera coordinate system;

FIG. 10 is a table illustrating an example of a data structure of a reference length in a world coordinate system retained in a detection unit;

DESCRIPTION OF EMBODIMENTS

Figure 1:
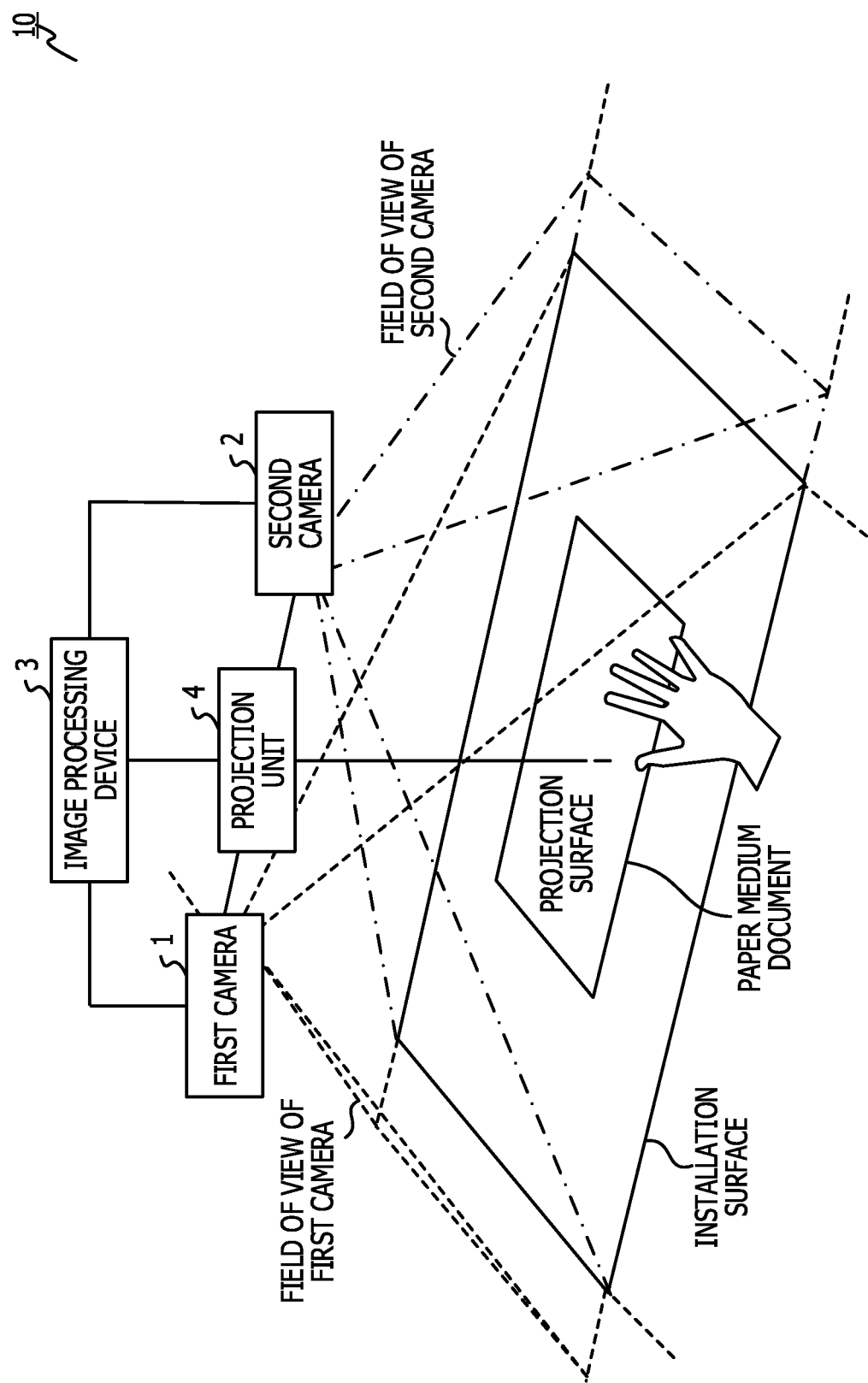
FIG. 1 is a schematic diagram of an image processing system which includes an image processing device according to an embodiment.

First, a problem in the related art will be described. In addition, the problem has been newly found as a result of the present inventors studying the related art in detail, and was not previously known. Through an intensive verification of the present inventors, it has been clearly found that it is difficult to synchronize acquisition times of images between a plurality of cameras in a binocular stereo method, and when capturing a finger of a user during operation, a distance of the finger of the user which is a target is not correctly calculated by a parallax change.

Through the verification of the present inventors, it has been found that a plurality of patterns exist in synchronization shift between the cameras. As a first pattern, for example, in a case where shift occurs at a start time of image capturing between two cameras, the acquisition time of the image enters a state of non-synchronization, even if an exposure time and an image capturing interval between the two cameras match. As a second pattern, for example, in a case where the exposure time is different between the two cameras, the acquisition time of the image enters a state of non-synchronization. For example, if the two cameras start to operate in a state of being set as an automatic exposure time, the exposure time can be changed each time a shutter is released. As a result, even in a case where the two cameras simultaneously operate and the initial shutter timings are the same, if there is a difference in the exposure time between the two cameras, the shutter timing of the next frame is shifted, and the acquisition time of an image enters a non-synchronization state. Furthermore, as a third pattern, for example, by a delay due to processing after image capturing of a camera is performed, such as compression processing of image in a camera module, or transfer processing performed by a USB, the acquisition time of the image enters the non-synchronization state.

An image processing device acquiring a first image and a second image which are captured by two cameras can determine whether acquisition time of the captured first and second images is in a synchronization state or a non-synchronization state. Due to this, it is impossible to determine whether or not the position of a finger of a user in a world coordinate system is calculated based on correct parallax. Due to this, calculation accuracy of the position of the finger is decreased. Incorporation of a synchronization circuit which synchronizes image capturing timings of the two cameras was reviewed as a comparative example performed by verification of the two inventors, but it has been found that it is difficult to apply in view of cost.

The inventors have found that it is possible to provide the image processing device in which position calculation accuracy of a certain portion of the user is improved by detecting the non-synchronization state of the first image and the second image and excluding, for example, an image in the non-synchronization state. It has been newly found that it is possible to further improve calculation position accuracy by controlling a calculation position which is calculated based on the image in a non-synchronization state.

By taking into account a technical item which is newly found through the intensive verification of the present inventors described above, examples of the image processing device, the image processing method, and the image processing program according to an embodiment will be described in detail based on the drawings, hereinafter. Such examples do not limit the disclosed technology.

FIRST EXAMPLE

FIG. 1 is a schematic diagram of an image processing system 10, which includes an image processing device 3 according to an embodiment. The image processing system 10 includes a first camera 1, a second camera 2, an image processing device 3, and a projection unit 4. The image processing device 3 is connected to the first camera 1, the second camera 2, and the projection unit 4 via a wire or wirelessly so as to communicate. In addition, the image processing device 3 includes a communication unit which is not illustrated, and can use network resources by performing two-way data transmission and reception with various external devices via communication lines. Furthermore, the projection unit 4 may be included in the image processing system 10 as occasion calls, but it is not a configuration element which is inevitably used.

The projection unit 4 is, for example, a display device such as a projector. The projection unit 4 displays, for example, an overlapped image including additional information or a projection document image. For example, the projection unit 4 projects by overlapping an overlapped image on a paper medium document including a book or the like which is an example of a projection surface, or projects a projection document image on a desk or a table which is an example of an installation surface. For convenience of description, the projection unit 4 will be described as one which projects the overlapped image on a paper medium.

The first camera 1 and the second camera 2 are image capturing devices such as a charge coupled device (CCD) camera or a complementary metal oxide semiconductor (CMOS) camera. The first camera 1 and the second camera 2 respectively have, for example, a field of view illustrated in FIG. 1. The first camera 1 and the second camera 2 capture a finger to be an example of a first portion which is a portion of the user and the paper medium document existing on the projection surface. In addition, the first portion may be back of a hand, but will be described as a finger in the first example for convenience of description. In addition, the position of the finger is set to be the position in the vicinity of a fingertip. The first camera 1 and the second camera 2 have a case where the non-synchronization state occurs, and at the image capturing timings (shutter timing), the shifts irregularly occur. For example, the first camera 1 and the second camera 2 may be cameras in which the exposure time is automatically set.

The image processing device 3 is, for example, a hardware circuit which is configured with a wired logic. In addition, the image processing device 3 may be a functional module which is realized by a computer program. Furthermore, the image processing device 3 may be an integrated circuit such as an application specific integrated circuit (ASIC) or a field programmable gate array (FPGA). It is possible to freely set a disposition position of the image processing device 3 in the image processing system 10, but for example, the image processing device 3 may be disposed in the same position as the projection unit 4. The image processing device 3 acquires a first image which is captured by the first camera 1, and a second image which is captured by the second camera 2, and calculates the position of a first portion of the user in the world coordinate system. In other words, the image processing device 3 acquires the first image and the second image which are captured by optical axes different from each other. In addition, the image processing device 3 may control projection processing of the projection unit 4 as occasion calls. A function of the image processing device 3 will be described in detail later.

As illustrated in FIG. 1, the projection unit 4 is installed in parallel with the installation surface or a ground surface, defines the projection surface, and may project the overlapped image on the paper medium document. In addition, the projection unit 4, the first camera 1, and the second camera 2 are installed on the projection surface vertically from top to bottom, for example. In the first camera 1 and the second camera 2, internal parameters are equally known, and optical axes thereof are in parallel with each other, and arbitrary horizontal axes of a plurality of images which are captured by the first camera 1 and the second camera 2 are disposed so as to be on the same straight line, which is a so-called parallel stereo disposition. By the first camera 1 and the second camera 2, an image including information such as color information of the first image and the second image, depth of the paper medium document, and depth of the user fingertip are captured. In addition, the first camera 1 and the second camera 2 may be disposed so as to be operated in a state of having the parallel stereo disposition. As a result, for example, a character direction of the paper medium document is estimated by an arbitrary image processing method, and the parallel stereo disposition is maintained in parallel with the character direction of the paper medium document (in other words, so as not to be vertical in the character direction), and thereby it is possible to correctly calculate the depth of the paper medium document. In addition, the overlapped image is projected by the projection unit 4 on the paper medium document. It is possible for the user to present the fingertip on the paper medium document from an arbitrary direction, and performs an interaction operation with respect to the overlapped image which is projected.

In addition, at the time of configuration of the image processing system 10 illustrated in FIG. 1, alignment (calibration) of a camera coordinate system of the first camera 1 and the second camera 2 and the world coordinate system of the projection unit 4 has already been performed. In addition, in a case where using for the image processing device 3 is started, a positional relationship between the first camera 1, the second camera 2, and the projection unit 4 is changed, the calibration may be performed at least once. Here, as an example of a specific calibration method, an arbitrary projection image which is projected by the projection unit 4 is captured by the first camera 1 and the second camera 2, and thereby a method of performing the calibration in the image processing device 3 will be described. In addition, in such a method, it is assumed that the calibration is already performed with respect to each of the first camera 1 and the second camera 2.

The projection unit 4 first projects an arbitrary marker with respect to arbitrary coordinate values $(x_p, y_p)$ in the world coordinate system. It is possible that such a marker uses an arbitrary color or a shape so as to be easily distinguished from the ambient background. Then, the first camera 1 and the second camera 2 capture a marker which is projected to a predetermined projection surface. Subsequently, the image processing device 3 recognizes the marker through the known arbitrary image processing. For example, in a case where the projection unit 4 projects a circle shape as the marker, the image processing device 3 is disclosed, for example, in "Kimme et al., 'Finding circles by an array of accumulators', Communications of the Association for Computing Machinery, #18, pp. 120-122, 1975." It is possible to recognize a circle shape using a Hough transform circle. Here, when the image processing device 3 recognizes the marker, the coordinate values are referred to as $(x_i, y_i)$. The image processing device 3 repeats the above-described processing four times at the same place. The image processing device 3 calculates each component of homography matrix H with three rows and three columns from four sets of a pair $(x_i, y_i)$ corresponding to $(x_p, y_p)$ obtained by such processing using an eight-dimensional simultaneous linear equation. In addition, the homography is a matrix representing a projection conversion from a plane into another plane in a three-dimensional space. In the first example, the image processing device 3 seeks association between camera coordinate planes of the first camera 1 and the second camera 2, and a projection unit coordinate plane of the projection unit 4. The image processing device 3 stores the calculated homography matrix, for example, in a cache or a memory which is not illustrated, and thereby it is possible to use the homography matrix at the time of projection of the overlapped image.

Figure 2A:
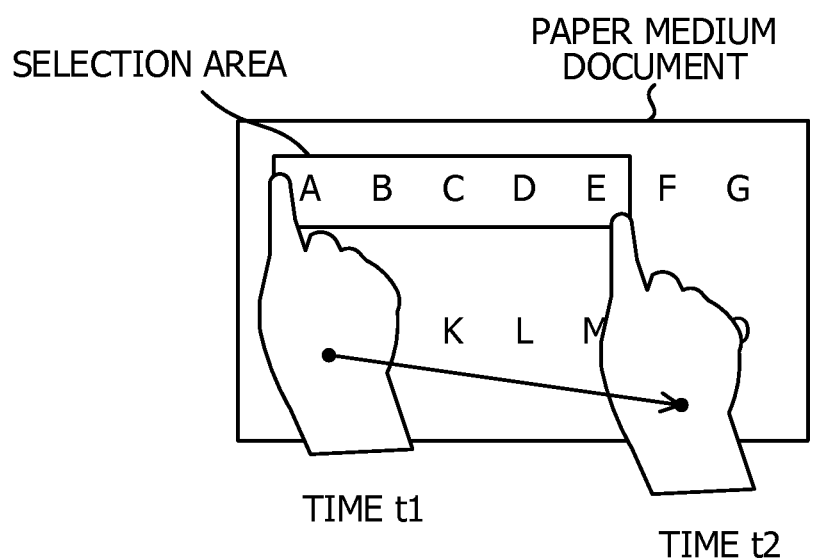
FIG. 2A is a conceptual view of scan processing of a paper medium document performed by an image processing system.
Figure 2B:
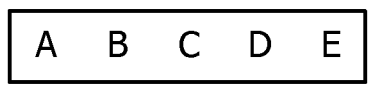
FIG. 2B is a conceptual view of an image in which scan processing is performed.

FIG. 2A is a conceptual view of scan processing of a paper medium document performed by the image processing system 10. FIG. 2B is a conceptual view of an image in which the scan processing is performed. As illustrated in FIG. 2A, the user places the finger in contact with the paper medium document, the finger is an example of the first portion (contact time is referred to as time t1), the finger slides to the position at time t2, and thereafter the finger is separated from the paper medium document. A rectangular area in which a line from a finger position at the time t1 to a finger position at the time t2 is set as a diagonal line is determined as a selection area. An image in the selection area such as that illustrated in FIG. 2B is stored in a storage unit 6, which will be described later, of the image processing device 3, as a scan image. In addition, it is possible that contact and separation of the finger with respect to the paper medium document is determined based on the calculated depth of the finger, for example.

Figure 4:
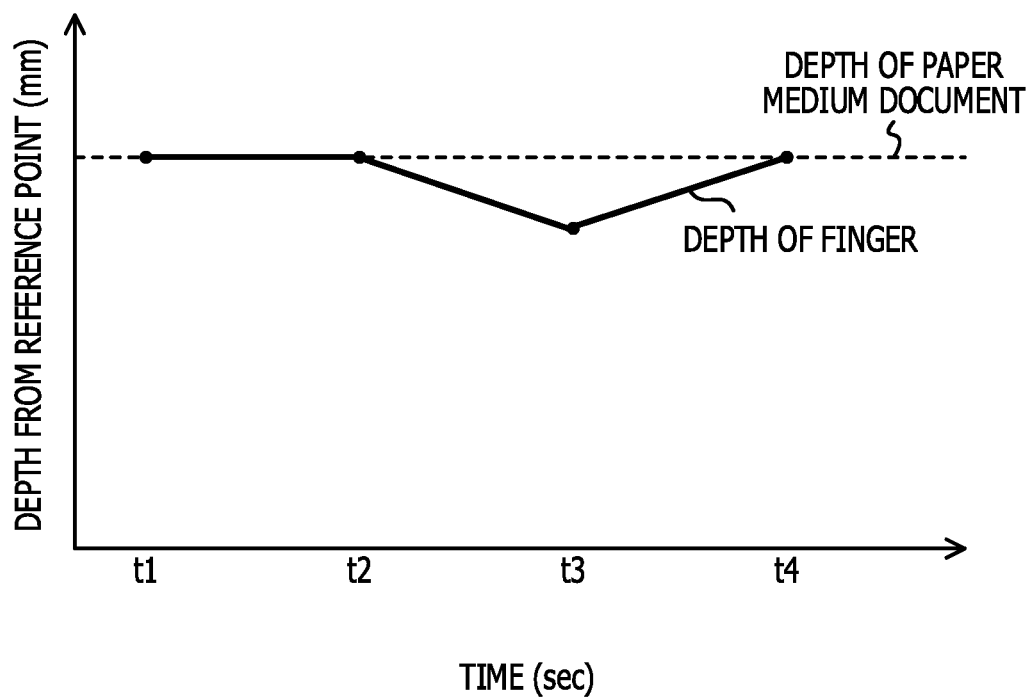
FIG. 4 is a conceptual view of a calculated fingertip depth based on parallax of a camera coordinate system.

Here, in a case where the first camera 1 and the second camera 2 are in a non-synchronization state, why the user moves the finger horizontally, and a reason why the calculation depth of the fingertip in the world coordinate system is changed will be described. FIG. 3 is a conceptual view of image capturing timings of the first camera 1 and the second camera 2 and the position of the finger in the camera coordinate system. FIG. 4 is a conceptual view of a calculated fingertip depth based on parallax of a camera coordinate system. In FIG. 3, an image which is captured by the first camera 1 is referred to as the first image, and an image which is captured by the second camera 2 is referred to as the second image. As illustrated in FIG. 3, since the shift (non-synchronization state) occurs irregularly at the shutter timing due to the above-described reason, the image capturing timing of the first camera 1 at time t3 is delayed longer than the image capturing timing of the second camera 2, for example. At this time, the fingertip position in the camera coordinate system is imaged at positions different from each other on the paper medium document by the first image and the second image. If the depth of the fingertip is calculated using a binocular stereo method based on the parallax defined by such a position, wrong determination which determines that the finger is positioned at the depth shallower than the depth of the paper medium document with respect to an arbitrary reference point (for example, it is possible to set a center point of installation points of the first camera 1 and the second camera 2 as the reference point) in the world coordinate system occurs, as illustrated in FIG. 4. As a result, contrary to the intention of the user, the selection of the selection area is ended at the time of time t3, and the image processing system 10 fails in the scan processing.

Figure 5:
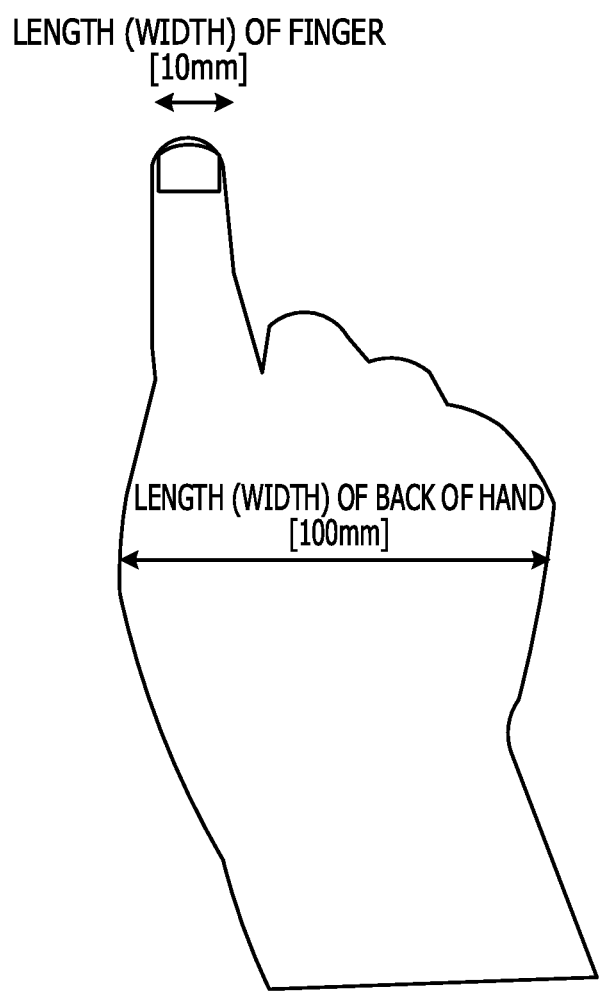
FIG. 5 is a dimensional view of a finger and the back of the hand of a user in a world coordinate system.

Here, detection processing in the non-synchronization state of the image processing device 3 and a technical feature of control processing of the calculation depth of the first portion will be described. As a result of intensive study, the present inventors have paid attention to a property in which the length (for example, unit is mm) in the world coordinate system (in actual space) is not changed if a finger of the same person is used, in a case where a hand of the user is the same posture, in the scan processing of the paper medium document. FIG. 5 is a dimensional view of a finger and back of a hand of the user in a world coordinate system. In FIG. 5, a width of the finger or a width of the back of the hand, which is calculated from the first image and the second image, is a value which is not changed if the posture of the hand is the same. In the scan processing using the finger, the inventors have also verified that there is a minor tendency for the posture of the hand to change. Based on such a feature, the length (may be referred to as a reference length Wref) in the world coordinate system of a predetermined position (for example, the finger which is an example of the first portion) of the hand in a predetermined posture is registered, and a calculation length W of the finger is compared based on the parallax of the first image and the second image which are calculated by a calculation unit 7, which will be described later, of such a reference length and the image processing device 3, and thereby it is possible to calculate the non-synchronization state. In addition, in the first example, a predetermined position of the hand of the user will be described as a finger which is an example of the first portion, for convenience of description.

It is possible that the calculation unit 7 calculates the calculation length W which is the length of the finger in the world coordinate system, based on the following formula.

$$Z = f \times X/x \quad (1)$$

$$W = Z \times w/f \quad (2)$$

However, in the above-described formula 1, Z is a z coordinate in the world coordinate system, X is an x coordinate in the world coordinate system, and x is x coordinate of the camera coordinate system. f is a focus distance of the first camera 1 and the second camera 2. In addition, Z is a depth of the finger calculated based on the parallax of the first image and the second image, and a calculation method of Z will be described in detail later. For example, by paying attention to X of the formula 1, a left end of the finger is referred to as X1, a right end of the finger is referred to as X2, a calculation length is set as W=|X2−X1|, and then if the formula 1 is modified by replacing the calculation length W with X, the calculation length W is represented by the formula 2. In addition, in a case where in the formula 2 described above, the number of pixels w is a width in the x direction of the finger of the camera coordinate system, the left end of the finger of the first image or the second image is referred to as x1, and the right end thereof is referred to as x2, it is possible to represent as w=|x2−x1|.

In addition, in other words, the calculation length W is a length (width of finger) in the x axis direction in the world coordinate system. For internal parameter estimation of the first camera 1 and the second camera 2 for calculating the focus distance f, it is possible to use the calibration method which is disclosed in "Zhang et al., 'A flexible new technique for camera calibration', IEEE Transactions on Pattern Analysis and Machine Intelligence, 22(11), pp. 1330-1334, 2000.", for example.

In a case where it is assumed that the posture of the finger is not changed during the scan processing, if the image capturing timings of the first image and of the second image are synchronized with each other, the calculation width W will be the same (or less than a predetermined threshold value) as the reference length Wref. In other words, if the reference length Wref and the calculation length W become different from each other in a value greater than the predetermined threshold value, it is possible to detect the non-synchronization state. For example, the image processing device 3 can discard an image in the non-synchronization state during the image processing. Furthermore, in a case where the non-synchronization state is detected, the image processing device 3 can calculate a control depth Z using the reference length Wref, w, and the focus distance f, based on the following formula. In addition, the control depth Z' may be referred to as a second depth.

$$Z' = f \times Wref/w \quad (3)$$

Figure 6:
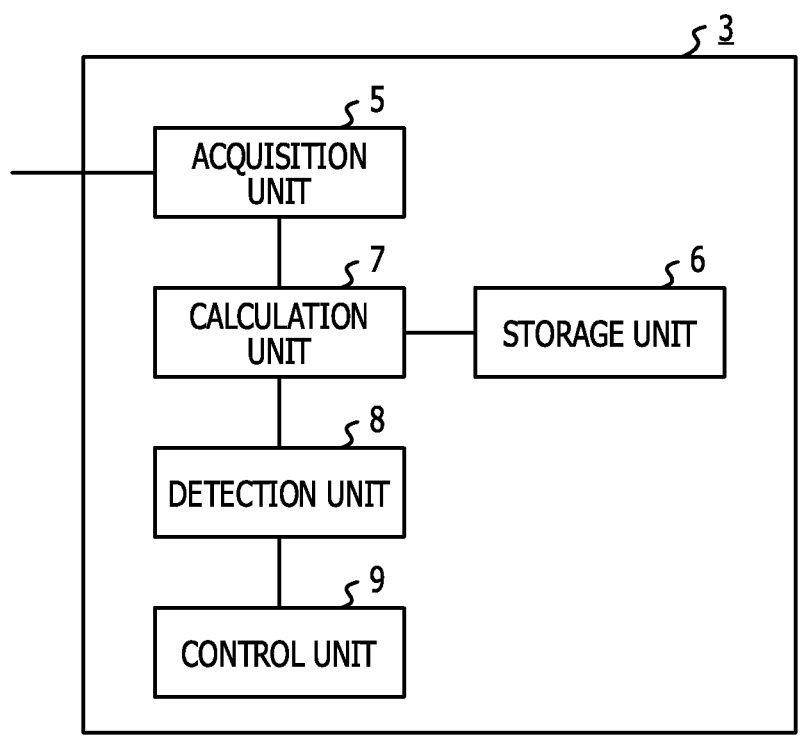
FIG. 6 is a functional block diagram of an image processing device according to an embodiment.

FIG. 6 is a functional block diagram of the image processing device 3 according to an embodiment. The image processing device 3 includes an acquisition unit 5, a storage unit 6, the calculation unit 7, a detection unit 8, and a control unit 9. In addition, the image processing device 3 includes a communication unit which is not illustrated, and can use network resource by performing two-way data transmission and reception with various external devices via communication lines.

The acquisition unit 5 is a hardware circuit which is configured with a wired logic. In addition, the acquisition unit 5 may be a function module realized by a computer program performed by the image processing device 3. The acquisition unit 5 receives the first image and the second image which are captured by optical axes different from each other from the external devices. Specifically, the acquisition unit 5 acquires the first image at the first time, and acquires the second image at the second time. Here, the first time and the second time do not necessarily match the above-described reason. In addition, resolution or acquisition frequency of the images which are acquired by the acquisition unit 5 may be defined as an arbitrary value according to a processing speed or processing accuracy which is desired for the image processing device 3. For example, the acquisition unit 5 may acquire the image with resolution of VGA (640×480) in the acquisition frequency of 30 FPS (30 frames per second). In addition, the external device which captures the images is, for example, the first camera 1 and the second camera 2. In addition, the first camera 1 captures the first image, and the second camera 2 captures the second image. The first camera 1 and the second camera 2 capture the images including the finger of the user as the first portion of the user, for example. In addition, the first camera 1 and the second camera 2 can also be included in the image processing device 3 as occasion calls. The acquisition unit 5 outputs the acquired image to the calculation unit 7.

The storage unit 6 is a semiconductor memory element such as a flash memory, or a storage device such as a hard disc drive (HDD) or an optical disc. In addition, the storage unit 6 is not limited to the above-described storage device, and may be a random access memory (RAM) or a read only memory (ROM). In addition, the storage unit 6 is not necessarily included in the image processing device 3. For example, various data may be stored in a cache, a memory or the like, which is not illustrated, of each functional unit which is included in the image processing device 3. In addition, by going through the communication line using the communication unit, which is not illustrated, provided in the image processing device 3, it is also possible to provide the storage unit 6 to an external device other than the image processing device 3.

In the storage unit 6, for example, three-dimensional shape information of the paper medium document which is a target of the scan processing is stored. In addition, in a case where the paper medium document is one sheet of thin paper, the paper medium document can be regarded as a two-dimension shape without a thickness existing on a plane of the projection surface which is set in advance. In a case where a paper surface is curved due to a book with a thick paper medium document or a state where the book is opened, the calculation unit 7 can acquire a three-dimension shape of the paper medium document at the time of image processing start of the image processing device 3, for example. For example, the calculation unit 7 can acquire the three-dimension shape of the paper medium document using a method which is called an active stereo method. There are various types of the active stereo method, and the calculation unit 7 can employ all types, but can use a spatial code method which is described in Japanese Laid-open Patent Publication No. 03-56402, for example. However, a realizing method is not limited to the spatial code method.

Figure 7:
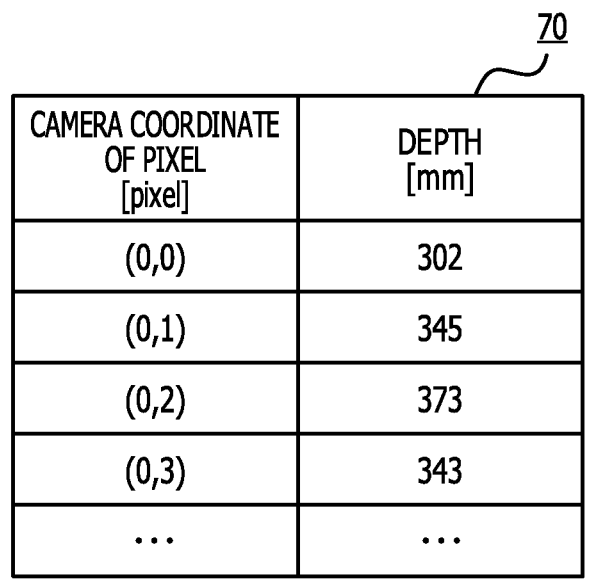
FIG. 7 is a table illustrating an example of a data structure of three-dimensional orthogonal coordinates of a paper medium document which is calculated by a calculation unit.

The calculation unit 7 which will be described later calculates a change in pixels of a projection pattern by setting coordinates of all pixels of a specific pattern which is obtained by patterning light and darkness and to which the projection unit 4 projects several times using the spatial code method, as an ID. By using such a result, the calculation unit 7 can calculate a depth (unit is mm) with respect to each pixel of the specific pattern to which the projection unit 4 projects using triangulation. In addition, by using the coordinates and the depth of each pixel with respect to an arbitrary reference point in the camera coordinate system, the calculation unit 7 can define three-dimension orthogonal coordinates in the world coordinate system which is a three-dimension shape of the paper medium document. In addition, for example, the reference point of the coordinates of each pixel can be defined as an upper left end of the first image or the second image which is acquired by the acquisition unit 5. In addition, for example, the reference point of the depth in the world coordinate system can be set as a midpoint of the installation points of the first camera 1 and the second camera 2. FIG. 7 is a table illustrating an example of a data structure of the three-dimensional orthogonal coordinates of the paper medium document which are calculated by the calculation unit 7. As illustrated in the table 70 of FIG. 7, a camera coordinate and a depth coordinate of each pixel with respect to an arbitrary reference point are stored as the three-dimension orthogonal coordinate of the paper medium document. The image processing device 3 compares the depth of the paper medium document with the first depth which is the depth of the finger described later, and thereby it is possible to determine whether or not the finger of the user is in contact with the paper medium document.

In addition, an overlapped image or a scan image is stored in the storage unit 6. Furthermore, in the storage unit 6, for example, a first feature value model (may be referred to as an identifier) in which a feature value of the first portion is extracted in advance may be stored in advance by prior learning. In addition, in the storage unit 6, various data which are obtained or retained by each function of the image processing device 3 may be stored as occasion calls. In addition, for example, the first feature value model can be produced based on a luminance gradient feature value such as a histogram of oriented gradients (HOG) feature value or a local binary pattern (LBP) feature value. For example, the prior learning is performed by using an image (positive image) in which a target object (finger which is an example of the first portion) is captured and an image (negative image) in which the target object is not captured, and a learning method of various known identifiers such as AdaBoost or a support vector machine (SVM) can be used for the prior learning. For example, as the learning method of the identifier, the learning method of the identifier using the SVM which is disclosed in "N. Dalal et al., 'Histograms of Oriented Gradients for Human Detection,' 2005 IEEE Computer Society Conference on Computer Vision and Pattern Recognition (CVPR), 2005" can be used.

The calculation unit 7 illustrated in FIG. 6 is a hardware circuit which is configured with a wired logic. In addition, the calculation unit 7 may be a function module which is realized by a computer program that is performed by the image processing device 3. The calculation unit 7 receives the first image and the second image from the acquisition unit 5 and extracts a color feature value of the first image and the second image or the luminance gradient feature value. When extracting the luminance gradient feature value, the calculation unit 7 can refer to the storage unit 6 as occasion calls. For example, the calculation unit 7 can extract a pixel value of RGB color space as a color feature value. In addition, for example, the calculation unit 7 can extract the HOG feature value or the LBP feature value as the luminance gradient feature value. In addition, for example, the luminance gradient feature value may be a feature value which can be calculated within a given rectangular area. For example, the calculation unit 7 can extract the HOG feature value which is an example of the luminance gradient feature value using the method disclosed in the above-described "N. Dalal et al., "Histograms of Oriented Gradients for Human Detection," 2005 IEEE Computer Society Conference on Computer Vision and Pattern Recognition (CVPR), 2005." In addition, in the first example, the calculation unit 7 is described such that the calculation unit 7 extracts the feature value, for convenience of description.

The calculation unit 7 detects the finger of the user which is an example of the first portion in the camera coordinate system based on the color feature value. In addition, in a case where the first portion is detected based on the luminance gradient feature value, the calculation unit 7 may refer to the first feature value model which is stored in the storage unit 6 as occasion calls. Here, a method in which the calculation unit 7 detects the first portion using the color feature value will be described. The calculation unit 7 extracts a skin color area using the extracted color feature value and detects a hand outline area (outline area in which the finger and back of the hand are combined) based on the skin color area using various known methods. When extracting color components of a skin color, the calculation unit 7 can use an appropriate threshold adjustment of an RGB space or a HSV space. The calculation unit 7 can detect the hand outline area using the method which is disclosed in, for example, Japanese Patent No. 3863809. In addition, in a state where learned data regarding a hand shape is retained in advance, the calculation unit 7 can also detect the hand outline area using a method of calculating a finger shape by calculating a degree of similarity between current image data and the learned data. In addition, the calculation unit 7 calculates the position of the fingertip of the user, which is respectively included in the first image and the second image, in the camera coordinate system. For example, the calculation unit 7 recognizes the number of fingers from the detected hand outline area and thereafter can calculate a fingertip coordinate from the outline of the hand outline area.

Figure 8:
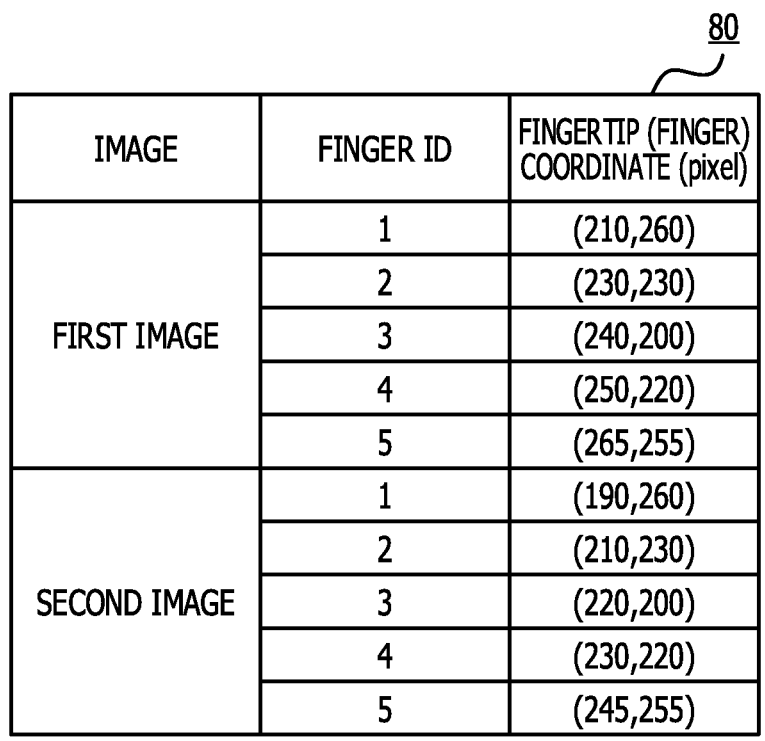
FIG. 8 is a table illustrating an example of a data structure including fingertip coordinates in a camera coordinate system which is calculated by a calculation unit.

FIG. 8 is a table illustrating an example of a data structure including the fingertip coordinate in the camera coordinate system which is calculated by the calculation unit 7. In addition, in the camera coordinate system in the table 80 of FIG. 8, an upper left end of the first image or the second image is set as an origin point, a right direction of the first image or the second image is defined as a positive direction of an x axis, and a downward direction of the first image or the second image is defined as a positive direction of a y axis. For example, in a case where the user spreads fingers of his hand, fingertip coordinates of each finger which is calculated from the first image and the second image are stored in association with the finger ID in the table 80. For example, the finger ID may be provided in an ascending order of coordinates in a horizontal direction. In addition, for example, the reference points of coordinates of each finger can be defined as an upper left end of the first image or the second image. In addition, the table 80 may be stored in a cache or a memory which is not illustrated in the calculation unit 7, or may be stored in the storage unit 6.

The calculation unit 7 may calculate a center position of the hand area (back of hand) using the method illustrated herein as occasion calls. For example, in a case where coordinates of pixels Pi within an area Ps extracted as the skin color area in an image of a frame t are referred to as (xi, t, yi, and t), and the number of pixels is referred to as Ns, as a calculation method of the center position, the calculation unit 7 can calculate the center position Gt (xt, yt) using the following formula.

$$x_t = \frac{1}{N_S} \sum_{P_i \in P_S} x_{i,t} \quad (4)$$

$$y_t = \frac{1}{N_S} \sum_{P_i \in P_S} y_{i,t}$$

Subsequently, the calculation unit 7 calculates the depth of the fingertip of the user in the world coordinate system using the binocular stereo method. If the length (reference length) of a line between the first camera 1 and the second camera 2 is referred to as b (in other words, reference length of a first optical center of the first image and a second optical center of the second image), the focus distances of the first camera 1 and the second camera 2 are referred to as f, and fingertip positions in the camera coordinates of the first image and the second image are referred to as (u, v) and (u', v'), respectively, then the calculation unit 7 can calculate a depth Z (in addition, the depth Z may be referred to as a first depth) in a depth direction with respect to an arbitrary reference point (for example, the center point of the first camera 1 and the second camera 2 may be set as the reference point). In other words, the reference point becomes a first optical center of the first image and a second optical center of the second image) in the world coordinate system using the following formula according to the principle of triangulation.

$$X = b \times f / |u - u'| \quad (5)$$

In addition, in the formula 5 described above, |u−u'| corresponds to parallax d which represents the position shift of the image which is obtained by capturing the same target object (for example, the finger of the user which is an example of the first portion). In addition, the calculation unit 7 can use a value stored in the table 80 of FIG. 8 as the values of u and u' in the formula 5 described above. For convenience of description, the table 80 of FIG. 8 is described with regard to a case where the hand is spread, but as illustrated in FIG. 5, in a case where only a forefinger is outstretched, only a finger ID1 is detected, and thus, a value stored in the finger ID1 may be used. In the following description, for convenience of description, it will be assumed that only the finger ID1 is detected.

Figure 9:
FIG. 9 is a table illustrating an example of a data structure in a camera coordinate system that is calculated by a calculation unit and in a world coordinate system.

In a case where the center position of the hand area (back of hand) is calculated, the calculation unit 7 may calculate an angle (the angle may be referred to as posture information) which connects the fingertip to the center in the camera coordinate of the first image or the second image. The calculation unit 7 can use the angle, for example, an angle tangent value Tan θ which is obtained by dividing a y coordinate difference between two points in the camera coordinate system by an x coordinate difference between the two points, but may also use another arbitrary value such as a sine value or a cosine value. FIG. 9 is a table illustrating an example of a data structure of the finger position in the camera coordinate system which is calculated by the calculation unit 7 and the world coordinate system. In the table 90 of FIG. 9, the index finger is stored as the finger ID1, and in addition to the coordinate position of the finger in the camera coordinate system and the depth in the world coordinate system, the center coordinate of the hand in the camera coordinate system or depth data in the world coordinate system and the angle tangent value are stored.

The calculation unit 7 calculates the calculation length W which is the width of the finger in the world coordinate system based on the formula 2 described above, using the number of pixels w indicating the width of the finger in the camera coordinate system of the first image or the second image, the focus distance f, and the depth Z (may be referred to as a first depth) in the world coordinate system. The calculation unit 7 outputs the calculated calculation length w to the detection unit 8.

In addition, before calculating the calculation length w, the calculation unit 7 may perform a posture determination of the hand as occasion calls. The calculation unit 7 can use the number of finger IDs and the angle tangent value which are stored in the table 90 of FIG. 9 for the posture determination of the hand. In a case where the finger ID is increased or decreased, or the angle tangent value is changed to a predetermined threshold value or more, the calculation unit 7 can determine that the posture of the hand is changed. In this case, the calculation unit 7 may also not calculate the calculation length W. In addition, the calculation unit 7 may also instruct the detection unit 8 described later to perform update processing of the reference length Wref in response to the changed posture of the hand.

The detection unit 8 of FIG. 6 is, for example, a hardware circuit which is configured with a wired logic. In addition, the detection unit 8 may be a function module which is realized by the computer program that is performed by the image processing device 3. The detection unit 8 receives the calculation length W from the calculation unit 7. The detection unit 8 detects non-synchronization state of the image capturing timings of the first image and the second image based on the change amount of the calculation length W. For example, the detection unit 8 detects a non-synchronization state by setting a comparison value of the calculation length W and the reference length Wref as the change amount.

In order for the detection unit 8 to detect the non-synchronization state, registering and using the reference length Wref indicating a correct length of the finger is desired. Here, a method of registering the reference length Wref of the finger in the detection unit 8 will be described. Since a shape of the finger is similar to a cylindrical shape, the posture of the hand has robustness with respect to a slight posture change due to a rotation or the like. The detection unit 8 first determines a displacement value of the finger for each frame. For example, for the determination of the displacement value of the hand, an absolute value of a difference between the finger coordinate of the first image or the second image or the center coordinate system of the hand area and the detection coordinate of the prior frame is calculated, and the absolute value or a value which is obtained by adding the absolute value to a value corresponding to a prior plural frames, is used as the determination value. If the determination value is less than a predetermined threshold value (may be referred to as a first threshold value), it is determined that the finger is not moving, and if the determination value is equal to or greater than the predetermined threshold value, it is determined that the finger is moving. If the finger is not moving, although the non-synchronization state occurs in the first image and the second image, the position of the finger in the world coordinate system exists in the same position as in a case where the non-synchronization state does not occur (synchronization state). Thus, there is a feature that the width of the finger calculated based on the parallax of the camera coordinate system becomes a correct value.

By using the above-described features, the detection unit 8 calculates the reference length Wref based on the finger coordinate in a case where it is determined that the finger is not moving, or the parallax of the camera coordinate system of the center of the hand area, using the following formula.

$$Wref = Z \times w/f \quad (6)$$

In the formula 6 described above, the reference length Wref can use the width of the finger or the width of the back of the finger, but for convenience of description, it is described in the first example that the width of the finger is used for the reference length Wref. FIG. 10 is a table illustrating an example of a data structure of the reference length in the world coordinate system retained in the detection unit 8. As illustrated in the table 91 of FIG. 10, even in a case where the width of the finger is used as the reference length Wref, a center coordinate of the finger and a distance of the center coordinate of the finger may be retained.

The detection unit 8 compares the calculation length W with the reference length Wref using the following formula.

$$|W-Wref| \geq Th; \text{non-synchronization state}$$

$$|W-Wref| < Th; \text{synchronization state} \quad (7)$$

The detection unit 8 compares the calculation length W with the reference length Wref using the formula 7 described above, and for example, in a case where an absolute value of the difference is equal to or greater than a predetermined threshold value Th (may be referred to as a second threshold value), it is determined that there is a synchronization shift (non-synchronization). In addition, in the formula 7 described above, |W−Wref| may be referred to as a comparison value. In addition, if the absolute value of the difference is less than the threshold value, it is determined that there is no synchronization shift (synchronization state), and then current frame processing ends without correction of the depth Z. The threshold value Th is set to a value which can absorb a difference of a length due to a slight difference of the postures of the hand within a range in which it is determined that the postures of the hand are the same as each other, and can be set to, for example, 5% of the reference length Wref. In addition, in the formula 7 described above, a ratio or the like generated by division, other than the difference, may be applied.

In a case where in the formula 7 described above, the absolute value of the difference between the calculation length W and the reference length Wref is less than the threshold value, and it is determined that the absolute value is in a synchronization state, and the detection unit 8 may update the reference length Wref. As a result, for example, even if the posture of the hand is changed, the detection unit 8 can detect the non-synchronization state. However, in the formula 7 described above, even in a case where the difference is less than the threshold value, there is a possibility that the faster the finger moves, the more the synchronization shift occurs. The reason is that the faster the finger moves, the greater a displacement value of the position of the finger in the capturing image due to the synchronization shift becomes, in a case where the synchronization shift between the first camera 1 and the second camera 2 occurs. In this way, there is a possibility that a small synchronization shift occurs even when the difference is less than the threshold value, and thus if the reference length Wref is frequently updated, errors can be accumulated in the reference length Wref. In consideration of such things, updating of the reference length Wref is performed in a case where the displacement value of the finger from the prior frame is less than the threshold value, in other words, it is updated only in a case where it is determined that the finger is slowly moving. For example, for the determination of the displacement value of the finger, it is possible to use an average distance between an xy coordinate of the fingertip of the first image or the second image in the prior frame, and the xy coordinate of the fingertip of the first image or the second image in the current frame. The detection unit 8 calculates the reference length Wref similarly to a method of registering the above-described reference length Wref, and can use the calculated reference length Wref as the updated reference length Wref.

The control unit 9 illustrated in FIG. 6 is, for example, a hardware circuit which is configured with a wired logic. In addition, the control unit 9 may be a function module which is realized by a computer program that is performed by the image processing device 3. The control unit 9 controls the first depth based on non-synchronization state detection performed by the detection unit 8. In a case where the non-synchronization state is detected, the control unit 9 calculates the second depth Z' which is a control depth based on the formula 3 described above using the reference length Wref, the number of pixels w of the first portion in the camera coordinate system in the current frame, and the focus distance f, and replaces the calculated second depth Z' with the first depth. In addition, for the number of pixels w, one of a value of the first image and a value of the second image may be used, and an average value of the two images may be used. In addition, in a case where the non-synchronization state is detected, the control unit 9 discards the first image and the second image in the non-synchronization state, and may cause the calculation unit 7 to calculate the depth Z, using the first image and the second image after the next frame.

Figure 11:
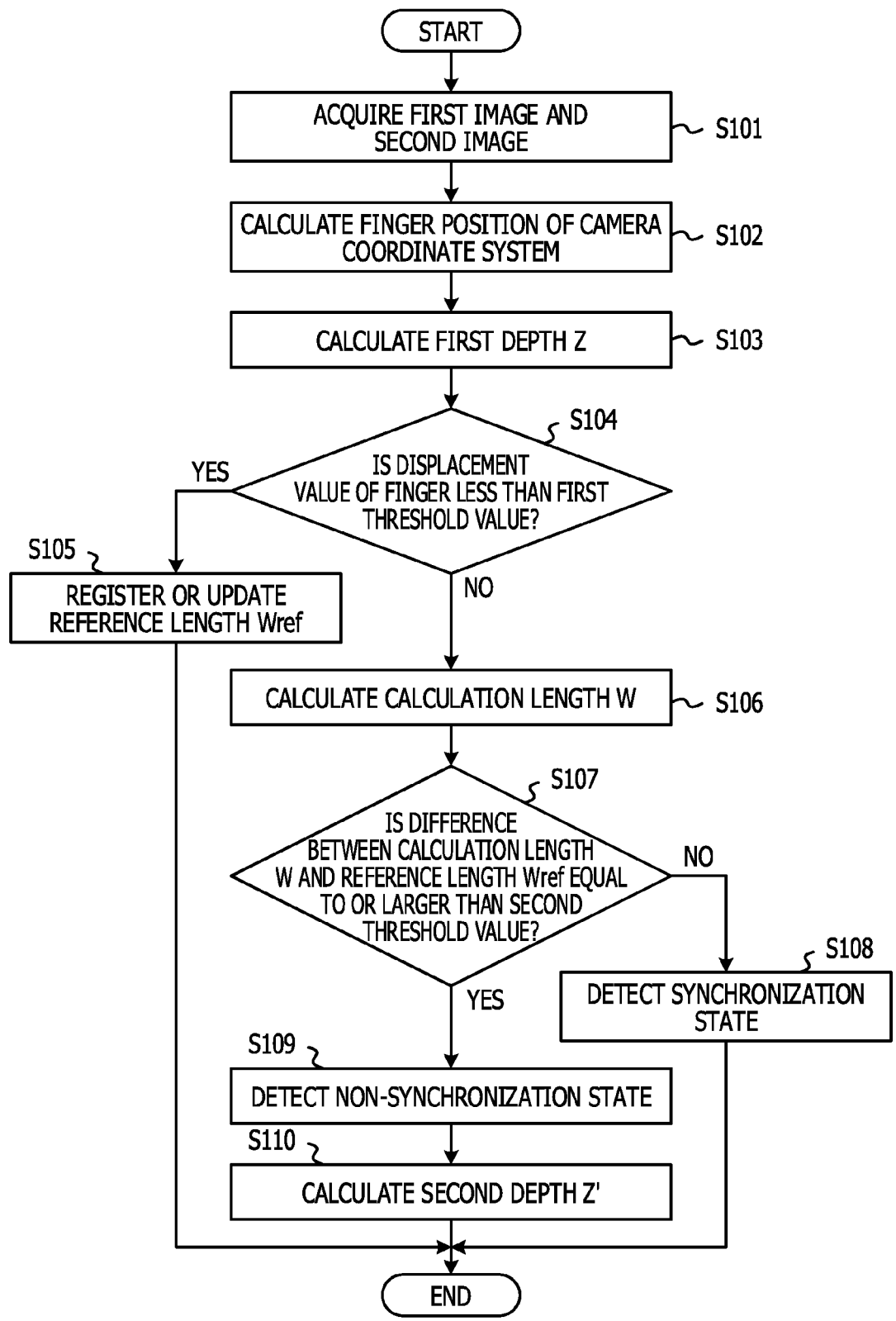
FIG. 11 is a flow chart of image processing performed by an image processing device.

FIG. 11 is a flow chart of image processing performed by the image processing device 3. The acquisition unit 5 acquires the first image and the second image which are captured by another optical axis from the external device (step S101). Specifically, the acquisition unit 5 acquires the first image at the first time, and acquires the second image at the second time. Next, the calculation unit 7 calculates the coordinate of the camera coordinate system which is included in the first image and the second image using, for example, a color feature value (step S102).

Subsequently, the calculation unit 7 calculates the depth of the finger of the user in the world coordinate system using the binocular stereo method. The calculation unit 7 calculates the first depth Z in the depth direction with respect to an arbitrary reference point in the world coordinate system using the formula 5 described above (step S103).

The detection unit 8 determines whether or not the displacement value of the finger is less than the first threshold value (step S104). Specifically, the detection unit 8 determines the displacement value of the finger for each frame. For example, for the determination of the displacement value of the finger, the finger coordinate of the first image or the second image or the center coordinate system of the hand area, the absolute value of the difference between the finger coordinate or the center coordinate and the detection coordinate of the prior frame, and the absolute value or the value which is obtained by adding the absolute value to the prior plural frames is used as the determination value. It is determined whether or not the determination value is less than the first threshold value which is a predetermined threshold value.

In step S104, in a case where the displacement value of the finger is less than the first threshold value (step S104: Yes), the detection unit 8 determines that the finger is not moving, and registers or updates the reference length Wref using the formula 6 described above (step S105), and then the image processing device 3 ends the image processing. In addition, in step S104, in a case where the displacement value of the finger is equal to or greater than the first threshold value (step S104: No), it is determined that the finger is moving, and the calculation unit 7 calculates the calculation length W using the formula 2 described above.

The detection unit 8 compares the calculation length W with the reference length Wref using the formula 7 described above, and determines whether or not the absolute value of the difference between the calculation length W and the reference length Wref is greater than the predetermined threshold value Th (may be referred to as the second threshold value) (step S107). In step S107, in a case where the absolute value is less than the second threshold value (step S107: No), the detection unit 8 detects that the image capturing timings of the first image and the second image are in a synchronization state (step S108), and the image processing device 3 ends the image processing. In step S107, in a case where the absolute value is equal to or greater than the second threshold value (step S107: Yes), the detection unit 8 detects that the image capturing timings of the first image and the second image are in a non-synchronization state (step S109). Next, the control unit 9 calculates the second depth Z' using the formula 3 described above (step S110), the first depth Z is replaced with the second depth Z', and the image processing device 3 ends the image processing.

According to the image processing device 3 of the first example, even in a case where the acquisition time of the first image and the second image is in a non-synchronization state, it is possible to improve the position calculation accuracy of the finger.

SECOND EXAMPLE

Figure 12A:
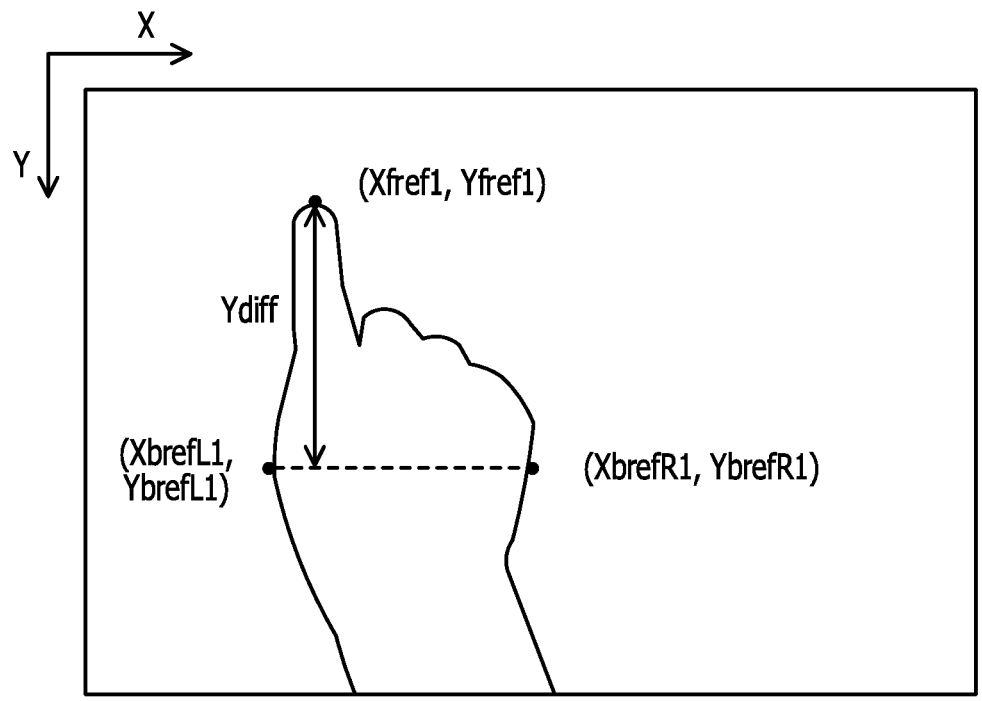
FIG. 12A is a conceptual view of coordinates of a portion of a hand in a first image.
Figure 12B:
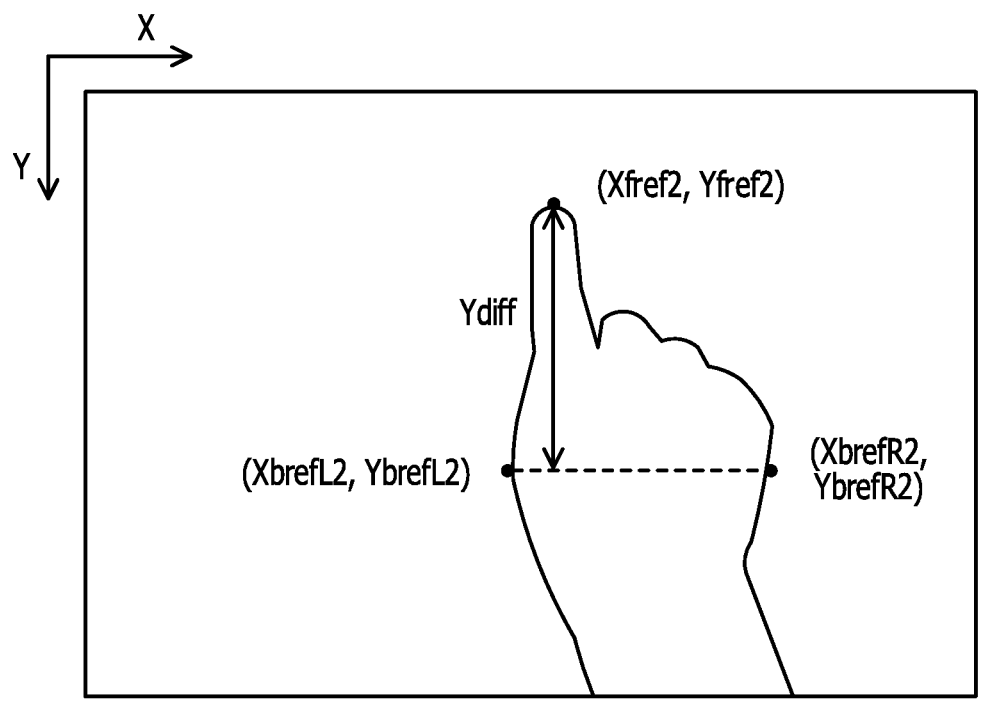
FIG. 12B is a conceptual view of coordinates of a portion of a hand in a second image.

In the first example, an example in which the width of the finger is applied is described as the reference length Wref, but in a second example, an example in which a width of back of a hand is applied as the reference width Wref will be described. In the second example, processing different from that of the first example will be described. FIG. 12A is a conceptual view of a coordinate of a portion of a hand in the first image. FIG. 12B is a conceptual view of a coordinate of a portion of a hand in the second image. In FIG. 12A and FIG. 12B, an image origin point is defined at an upper left end, an x axis is defined in a horizontal direction, and a y axis is defined in a vertical direction. In FIG. 12A and FIG. 12B, the calculation unit 7 of FIG. 6 calculates coordinates (Xfref1, Yferf1) and (Xferf2, Yfref2) of a fingertip, and calculates a depth Zfref from a reference point (for example, the center point of the first camera 1 and the second camera 2) in an actual world coordinate of the fingertip based on the following formula.

$$Z\mathit{fref} = B \times f / |X\mathit{fref}1 - X\mathit{fref}2| \qquad (8)$$

The calculation unit 7 seeks the number of pixels of a width of back of a hand in the first image. For the width of back of the hand, an arbitrary place can be employed, but, for example, the width of back of the hand can be defined based on two points in which y coordinates existing on a hand area outline are the same horizontal point and an X width becomes maximum. In FIG. 12A, a left end point (XbrefL1, YbrefL1) and a right end point (XbrefR1, YberfR1) of the back of the hand are the width of x coordinates.

The calculation unit 7 also seeks a left end point and a right end point of the back of the hand in the second image, in the same manner as in the first image. As a calculation method, the width of back of the hand may be defined based on two points in which y coordinates existing on a hand area outline are the same horizontal points and the x width becomes maximum, in the same manner as in the first image. In addition, the calculation unit 7 seeks a y coordinate (Ybref2) seeking the width of back of the hand, by adding a difference Ydiff between (Yfref1, Ybref1) of the coordinates of the first image to (Yfref2), and horizontal points (XbrefL2, YbrefL2), and (XbrefR2) and (YbrefR2) may be set on the hand area outline with (Ybref2).

Next, the calculation unit 7, based on a left end point and a right end point of the back of the hand, calculates Zbref which is the depth in the world coordinate system of the left end point and the right end point, using the following formula.

$$Z\mathit{bref}1 = B \times f / |X\mathit{brefL}1 - X\mathit{brefL}2|$$

$$Z\mathit{bref}2 = B \times f / |X\mathit{brefR}1 - X\mathit{brefR}2|$$

$$Z\mathit{bref} = (Z\mathit{bref}1 + Z\mathit{bref}2)/2 \qquad (9)$$

The calculation unit 7, based on Zbref calculated by the formula 9 described above, calculates the reference length Wref which is the width of the hand in the world coordinate system using the following formula.

$$W\mathit{ref}1 = Z\mathit{bref} \times (X\mathit{brefR}1 - X\mathit{brefL}1)/f$$

$$Wref2 = Zbref \times (XbrefR2 - XbrefL2)/f$$

$$Wref = (Wref1 + Wref2)/2 \qquad (10)$$

Furthermore, the calculation unit 7 calculates a difference Zdiff of a z coordinate between the fingertip and the back of the hand, based on the following formula.

$$Zdiff = Zbref - Zfref \qquad (11)$$

In a case where the detection unit 8 detects the non-synchronization state, the control unit 9 calculates coordinates (Xfref1, Tfref1), and (Xfref2, Tfref2) of the fingertip from the first image and the second image, and calculates a distance Zf from a camera of the fingertip using the following formula.

$$Zf = B \times f/|Xfref1 - Xfref2| \qquad (12)$$

Next, the control unit 9 adds the difference Zdiff of the z coordinate, which is calculated at the time of registering Wref, between the fingertip and the back of the hand to Zf, and calculates the z coordinate Zb of the back of the hand, based on the following formula.

$$Zb = Zf + Zdiff \qquad (13)$$

According to the image processing device 3 of the second example, it is possible to improve the position calculation accuracy of the finger, even in a case where the acquisition time of the first image and the second image is in a non-synchronization state.

THIRD EXAMPLE

Figure 13:
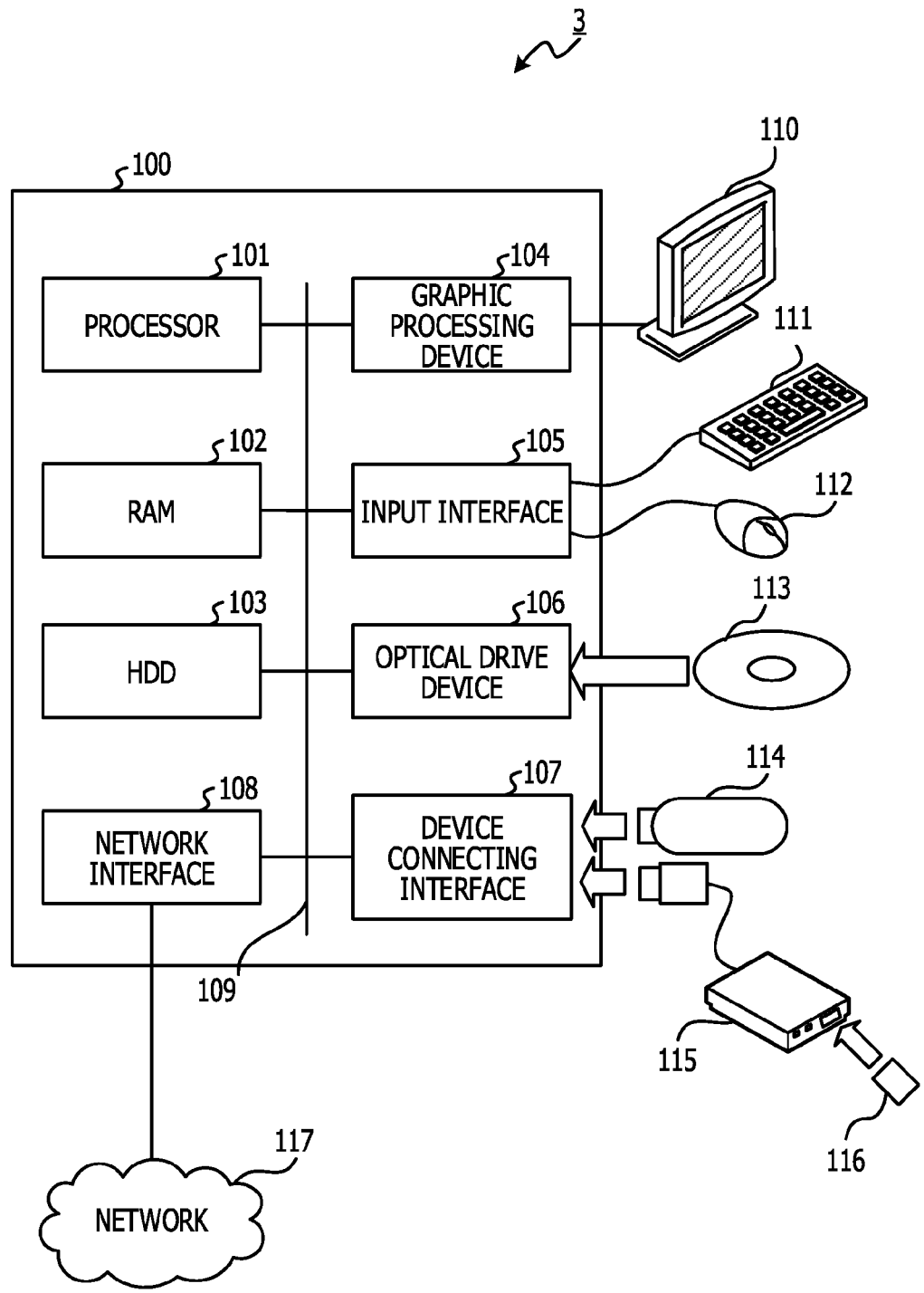
FIG. 13 is a hardware configuration diagram of a computer that functions as an image processing device according to an embodiment.

FIG. 13 is a hardware configuration diagram of a computer which functions as the image processing device 3 according to an embodiment. As illustrated in FIG. 13, the image processing device 3 is configured to include a computer 100 and input devices (peripheral devices) which are connected to the computer 100.

The computer 100 is overall controlled by a processor 101. The processor 101 is connected to a random access memory (RAM) 102 and a plurality of peripheral devices via a bus 109. In addition, the processor 101 may be a multi-processor. In addition, the processor 101 is, for example, a CPU, a microprocessing unit (MPU), a digital signal processor (DSP), an application specific integrated circuit (ASIC), or a programmable logic device (PLD). Furthermore, the processor 101 may be a combination of two elements or more of the CPU, the MPU, the DSP, the ASIC, and the PLD.

The RAM 102 is used as a main storage device of the computer 100. The RAM 102 temporarily stores a program of an operating system (OS) which is executed in the processor 101, or at least a portion of application programs. In addition, the RAM 102 stores various data which are used for processing to be performed by the processor 101.

The peripheral device connected to the bus 109 includes a hard disc drive (HDD) 103, a graphic processing device 104, an input interface 105, an optical drive device 106, a device connecting interface 107, and a network interface 108.

The HDD 103 performs magnetically reading and writing of data with respect to an embedded disc. The HDD 103 is used as an auxiliary storage device of the computer 100, for example. The HDD 103 stores an OS program, an application program, and various data. In addition, as the auxiliary storage device, a semiconductor memory device such as a flash memory can be used.

The graphic processing device 104 is connected to a monitor 110. The graphic processing device 104 displays various images on a screen of the monitor 110 according to a command from the processor 101. The monitor 110 includes a display device using a cathode ray tube (CRT), a liquid crystal display device, or the like.

The input interface 105 is connected to a keyboard 111 and a mouse 112. The input interface 105 transmits a signal which is transferred from the keyboard 111 or the mouse 112 to the processor 101. In addition, the mouse 112 is an example of a pointing device, and another pointing device can also be used for the mouse 112. Another pointing device includes a touch panel, a tablet, a touch pad, a track ball, or the like.

The optical drive device 106 reads the data recorded on an optical disc 113 using a laser beam or the like. The optical disc 113 is a portable recording medium in which data which can be read by reflection of light is recorded. The optical disc 113 includes a digital versatile disc (DVD), a DVD-RAM, a compact disc read only memory (CD-ROM), a CD-R (recordable)/RW (rewritable), or the like. The program stored in the optical disc 113 which is a portable recording medium is installed in the image processing device 3 via the optical drive device 106. A predetermined installed program can be executed by the image processing device 3.

The device connecting interface 107 is a communication interface for connecting the peripheral device to the computer 100. For example, the device connecting interface 107 can be connected to a memory device 114 or a memory reader writer 115. The memory device 114 is a recording medium in which a communication function with the device connecting interface 107 is embedded. The memory reader writer 115 is a device which writes data to a memory card 116 or reads data from the memory card 116. The memory card 116 is a recording medium of a card type.

The network interface 108 is connected to a network 117. The network interface 108 transmits or receives data to or from another computer or the communication device via the network 117.

The computer 100 executes, for example, a program recorded in a computer readable recording medium, thereby realizing the above-described image processing function. A program in which processing content that is executed in the computer 100 is described can be recorded in various recording mediums. The above-described program can be configured from one or a plurality of function modules. For example, the program can be configured from a function module which realizes processing of the acquisition unit 5, the calculation unit 7, the storage unit 6, the detection unit 8, and the control unit 9 which are illustrated in FIG. 6. In addition, the program which is executed in the computer 100 can be stored in the HDD 103. The processor 101 loads at least a portion of the program in the HDD 103 to the RAM 102 and then executes the program. In addition, the program which is executed in the computer 100 can be recorded in a portable recording medium such as the optical disc 113, the memory device 114, and the memory card 116. For example, the program stored in the portable recording medium is installed in the HDD 103 by a control of the processor 101, and thereafter, can be executed. In addition, the processor 101 reads the program directly from the portable recording medium and can execute the program.

In addition, each configuration element of each device which is illustrated may not be configured physically as illustrated. That is, a specific form of distribution and integration of each device is not limited to that illustrated, and it is possible to configure all or a portion thereof by distributing and integrating functionally or physically by an arbitrary unit, according to various loads, use conditions, or the like. In addition, various processes described in the above examples can be realized by executing the program prepared in advance in the computer such as a personal computer and a workstation.

In the present embodiments, a case where the finger and the background having colors similar to skin color is described as an example, but the present embodiments are not limited thereto. It is needless to say that the present embodiments can be applied, for example, even in a case where the finger is covered with a glove and the background similar to a color of the glove is used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a processor; and
   a memory that stores a plurality of instructions, which when executed by the processor cause the processor to execute:
   acquiring a first image and a second image at irregular intervals that are captured by cameras having optical axes different from each other;
   calculating a reference length of a first portion of a user, the first portion being included in the first image and the second image; and
   detecting a non-synchronization state of image capturing between the first image and the second image, based on a change of the reference length, wherein
   the calculating the reference length calculates a first depth of the first portion from an arbitrary reference point based on a relationship expressed by a focus distance, a parallax with regard to the cameras, and a baseline length between a first optical center of the first image and a second optical center of the second image,
   the first depth calculated based on a detection result of the non-synchronization state, and
   the reference length calculated in a case where a displacement value of the first portion that is calculated from a plurality of parallaxes acquired at different timings is less than a predetermined first threshold value.

2. The device according to claim 1, wherein the detecting detects the non-synchronization state by setting a comparison value between a second length of the first portion and the reference length of the first portion as the difference.

3. The device according to claim 1, wherein each of the calculating calculates based on the parallax between a first position of the first portion at a first time when the acquiring acquires the first image, and a second position of a second portion at a second time when the acquiring acquires the second image.

4. The device according to claim 1, wherein the reference point is a center point of the first optical center or the second optical center.

5. The device according to claim 2, wherein the detecting detects the non-synchronization state in a case where the comparison value is equal to or greater than a predetermined second threshold value.

6. The device according to claim 2, wherein the comparison value is a difference or a ratio between the second length and the reference length.

7. The device according to claim 1, wherein the controlling, in a case where the non-synchronization state is detected, calculates a second depth of the first portion from the reference point, based on a relationship expressed by a length of the first portion, the focus distance, and the reference length in the camera coordinate system, and replaces the first depth with the second depth.

8. The device according to claim 7, wherein the controlling calculates the second depth based on posture information of the first portion.

9. The device according to claim 1, wherein the first portion is a finger or back of a hand.

10. An image processing method comprising:
    by a processor,
    acquiring a first image and a second image at irregular intervals that are captured by cameras having optical axes different from each other;
    calculating, a reference length of a first portion of a user, the first portion being included in the first image and the second image; and
    detecting a non-synchronization state of image capturing between the first image and the second image, based on a change of the reference length; wherein
    the calculating the reference length calculates a first depth of the first portion from an arbitrary reference point based on a relationship expressed by a focus distance, a parallax with regard to the cameras, and a baseline length between a first optical center of the first image and a second optical center of the second image,
    the first depth calculated based on a detection result of the non-synchronization state, and
    the reference length calculated in a case where a displacement value of the first portion that is calculated from a plurality of parallaxes acquired at different timings is less than a predetermined first threshold value.

11. The method according to claim 10, wherein the detecting detects the non-synchronization state by setting a comparison value between a second length of the first portion and the reference length of the first portion as the difference.

12. The method according to claim 10, wherein each of the calculating calculates based on the parallax between a first position of the first portion at a first time when the acquiring acquires the first image, and a second position of a second portion at a second time when the acquiring acquires the second image.

13. The method according to claim 10, wherein the reference point is a center point of the first optical center or the second optical center.

14. A computer-readable non-transitory storage medium storing an image processing program that causes a computer to execute a process comprising:
    acquiring a first image and a second image at irregular intervals that are captured by cameras having optical axes different from each other;
    calculating a reference length of a first portion of a user, the first portion being included in the first image and the second image; and detecting a non-synchronization state of image capturing between the first image and the second image, based on a change of the reference length, wherein
the calculating the reference length calculates a first depth of the first portion from an arbitrary reference point based on a relationship expressed by a focus distance, a parallax with regard to the cameras, and a baseline length between a first optical center of the first image and a second optical center of the second image,
the first depth calculated based on a detection result of the non-synchronization state, and
the reference length calculated in a case where a displacement value of the first portion that is calculated from a plurality of parallaxes acquired at different timings is less than a predetermined first threshold value.

* * * * *